United States Patent
Shen et al.

(10) Patent No.: US 11,482,717 B2
(45) Date of Patent: Oct. 25, 2022

(54) DEHYDROGENATION METHOD FOR HYDROGEN STORAGE MATERIALS

(71) Applicant: YUAN ZE UNIVERSITY, Taoyuan (TW)

(72) Inventors: Chia-Chieh Shen, Taoyuan (TW); Shih-Hung Chan, Taoyuan (TW); Fang-Bor Weng, Taoyuan (TW); Ho Chun Cheung, Taoyuan (TW); Yi-Hsuan Lin, Taoyuan (TW); Mei-Chin Chen, Taoyuan (TW); Jyun-Wei Chen, Taoyuan (TW); Ya-Che Wu, Taoyuan (TW); Han-Wen Liu, Taoyuan (TW); Kuan-Lin Chen, Taoyuan (TW); Jin-Xun Zhang, Taoyuan (TW)

(*) Notice: Subject to any disclaimer, the term of this patent is extended or adjusted under 35 U.S.C. 154(b) by 0 days.

(21) Appl. No.: 17/218,905

(22) Filed: Mar. 31, 2021

(65) Prior Publication Data
US 2022/0093945 A1 Mar. 24, 2022

(30) Foreign Application Priority Data
Sep. 24, 2020 (TW) .................................. 109133087

(51) Int. Cl.
*H01M 4/00* (2006.01)
*H01M 8/04119* (2016.01)
*H01M 4/90* (2006.01)

(52) U.S. Cl.
CPC ..... *H01M 8/04119* (2013.01); *H01M 4/9041* (2013.01)

(58) Field of Classification Search
CPC ............................ H01M 8/04119; H01M 4/90
See application file for complete search history.

(56) References Cited

U.S. PATENT DOCUMENTS

| 2007/0196702 A1* | 8/2007 | Sridhar ..................... C25B 1/02 429/421 |
| 2009/0297896 A1* | 12/2009 | Kimbara ............... H01M 8/065 429/437 |
| 2016/0230257 A1* | 8/2016 | Young ................... H01M 12/08 |

FOREIGN PATENT DOCUMENTS

| TW | M314917 U | 7/2007 |
| TW | I691456 B | 4/2020 |

* cited by examiner

*Primary Examiner* — Cynthia H Kelly
*Assistant Examiner* — Monique M Wills
(74) *Attorney, Agent, or Firm* — Egbert, McDaniel & Swartz, PLLC

(57) ABSTRACT

A dehydrogenation method for hydrogen storage materials, which is executed by a fuel cell system. The fuel cell system includes a hydrogen storage material tank, a heating unit, a fuel cell, a pump, a water thermal management unit and a heat recovery unit. The described dehydrogenation method utilizes the heating unit and the heat recovery unit to provide thermal energy to the hydrogen storage material tank, so that hydrogen storage material is heated to the dehydrogenation temperature. The pump extracts hydrogen from the hydrogen storage material tank, so that the hydrogen storage material is under negative pressure (i.e. $H_2$ absolute pressure below 1 atm), according to which the hydrogen storage material is dehydrogenated, and the dehydrogenation efficiency and the amount of hydrogen release are improved. The method n can reduce the dehydrogenation temperature of the hydrogen storage material, and reduce the thermal energy consumption for heating the hydrogen storage material.

11 Claims, 5 Drawing Sheets

| Hydrogen storage material | Temperature(°C) | Dehydrogenation plateau pressure (atm, absolute) |
|---|---|---|
| Mg (dihydride -> solid solution) | 300 | 0.396 |
| | 275 | 0.186 |
| | 250 | 0.081 |
| | 200 | 0.012 |
| | 150 | 0.001 |
| $Ti_1V_{1.1}Mn_{0.9}$ (monohydride -> solid solution) BCC-TiV Solid solution type | 120 | 0.758 |
| | 90 | 0.154 |
| | 60 | 0.023 |
| | 30 | 0.002 |
| $TiFe_{0.8}Ni_{0.2}$ (monohydride -> solid solution) AB type | 80 | 0.832 |
| | 60 | 0.360 |
| | 30 | 0.083 |
| | 0 | 0.014 |
| $Mg_{2.4}Ni_1Cu_{0.2}$ (hydride -> solid solution) $A_2B$ type | 250 | 0.486 |
| | 200 | 0.095 |
| | 100 | 0.001 |

Table 1

FIG. 4

| Hydrogen absorption amount of material (wt%) | Dehydrogenation temperature (°C) | | Average dehydrogenation rate [ml/(min · g)] | Power by fuel cell (W) | Conversion ratio from hydrogen to electricity (%) |
| --- | --- | --- | --- | --- | --- |
| | Known technology | Preferred embodiment | | | |
| 4.8 | 350 | - | 6.4 | - | - |
| 4.9 | - | 250 | 5.2 | 0.8 | 18 |
| 5.2 | 300 | - | 1.1 | - | - |
| 5.2 | - | 300 | 19.0 | 0.5 | 12 |
| 5.6 | 325~335 | - | 4.5 | - | - |
| 6.0 | 370 | - | 13.9 | - | - |

Table 2

FIG. 5

DEHYDROGENATION METHOD FOR HYDROGEN STORAGE MATERIALS

BACKGROUND OF INVENTION

1. Field of the Invention

The present invention relates generally to hydrogen storage materials, and more particularly to a dehydrogenation method for hydrogen storage materials.

2. Description of Related Art

A fuel cell generally uses hydrogen as fuel, and when the fuel cell using hydrogen as fuel generates electricity, water and thermal energy is produced, and it is a clean energy.

Hydrogen storage material is a material which can absorb and release hydrogen. The hydrogen can be stored by the hydrogen storage material. A fuel cell system using hydrogen storage material to provide hydrogen as fuel includes a hydrogen storage tank, a heating unit, a fuel cell, a pump and a water thermal management unit. The hydrogen storage material is provided in the hydrogen storage tank, and the heating unit heats the hydrogen storage tank, so that the hydrogen storage material releases hydrogen into the fuel cell for generating electricity. The fuel cell is a Low Temperature Proton Exchange Membrane Fuel Cell. The hydrogen is imported through the anode of the fuel cell, and the oxidizer (e.g. oxygen) is imported through the cathode of the fuel cell. The fuel cell generates electricity and water, and the heat is generated in the generation of electricity. The pump feeds back the unreacted hydrogen to the anode of the fuel cell. The fuel cell has a water thermal management unit, which controls the temperature and humidity of the fuel cell.

The Mg hydrogen storage material has very high commercial potential. Taking $MgH_2$ as an example, the hydrogen release operating temperature of a traditional Mg hydrogen storage tank is about 350° C., and the Mg powder is likely to sinter at a high temperature, reducing the lifetime of the Mg hydrogen storage material.

SUMMARY OF THE INVENTION

The primary object of the present invention is to provide a dehydrogenation method for hydrogen storage materials.

Based on said object, the present invention is a dehydrogenation method for hydrogen storage materials which is executed by a fuel cell system.

The fuel cell system includes a hydrogen storage material tank, a heating unit, a fuel cell, a pump, a water thermal management unit and a heat recovery unit. The hydrogen storage material tank produces hydrogen, the hydrogen storage material tank is disposed on the heating unit, and the hydrogen storage material tank has a hydrogen outlet. The fuel cell has an inlet and an outlet. Unreacted hydrogen from the outlet of the fuel cell is mixed with the hydrogen released from the hydrogen storage material tank, and the mixed hydrogen is driven via a pump to flow into the inlet of the fuel cell. The heat recovery unit is coupled with the fuel cell and the hydrogen storage material tank, so as to recover the thermal energy generated by the fuel cell and supply the thermal energy to the hydrogen storage material tank.

Said dehydrogenation method includes the following steps:

Preparation of the hydrogen storage material tank: the hydrogen storage material is placed in the hydrogen storage material tank, the hydrogen storage material can absorb and release hydrogen, and the hydrogen storage material contains hydrogen; and The hydrogen storage material is heated, and a negative pressure state (i.e. $H_2$ absolute pressure below 1 atm) is formed inside the hydrogen storage material tank. The heating unit and the heat recovery unit provide thermal energy for the hydrogen storage material tank, so that the hydrogen storage material is heated to the dehydrogenation temperature. The pump extracts the hydrogen from the hydrogen storage material tank, so that the hydrogen storage material is in a negative pressure state. The hydrogen storage material is dehydrogenated, and the dehydrogenation efficiency and the amount of hydrogen release are increased. The pump feeds the hydrogen from the hydrogen storage material tank into the hydrogen inlet of the fuel cell, so as to increase the efficiency of the fuel cell system.

The present invention can reduce the dehydrogenation temperature of the hydrogen storage material, reduce the thermal consumption for heating the hydrogen storage material, and avoid sintering the hydrogen storage material at high temperatures to maintain its original hydrogen storage capacity after dehydrogenation. The heat recovery unit recovers the thermal energy generated by the fuel cell and supplies the thermal energy to the hydrogen storage material tank. The thermal management loading of the fuel cell system is simplified.

BRIEF DESCRIPTION OF THE DRAWINGS

FIG. 4 illustrates the dehydrogenation pressure and dehydrogenation temperature of different hydrogen storage materials in Table 1.

FIG. 5 illustrates the dehydrogenation effects of the preferred embodiment and the known technology in Table 2.

DETAILED DESCRIPTION OF THE INVENTION

Figure 1:
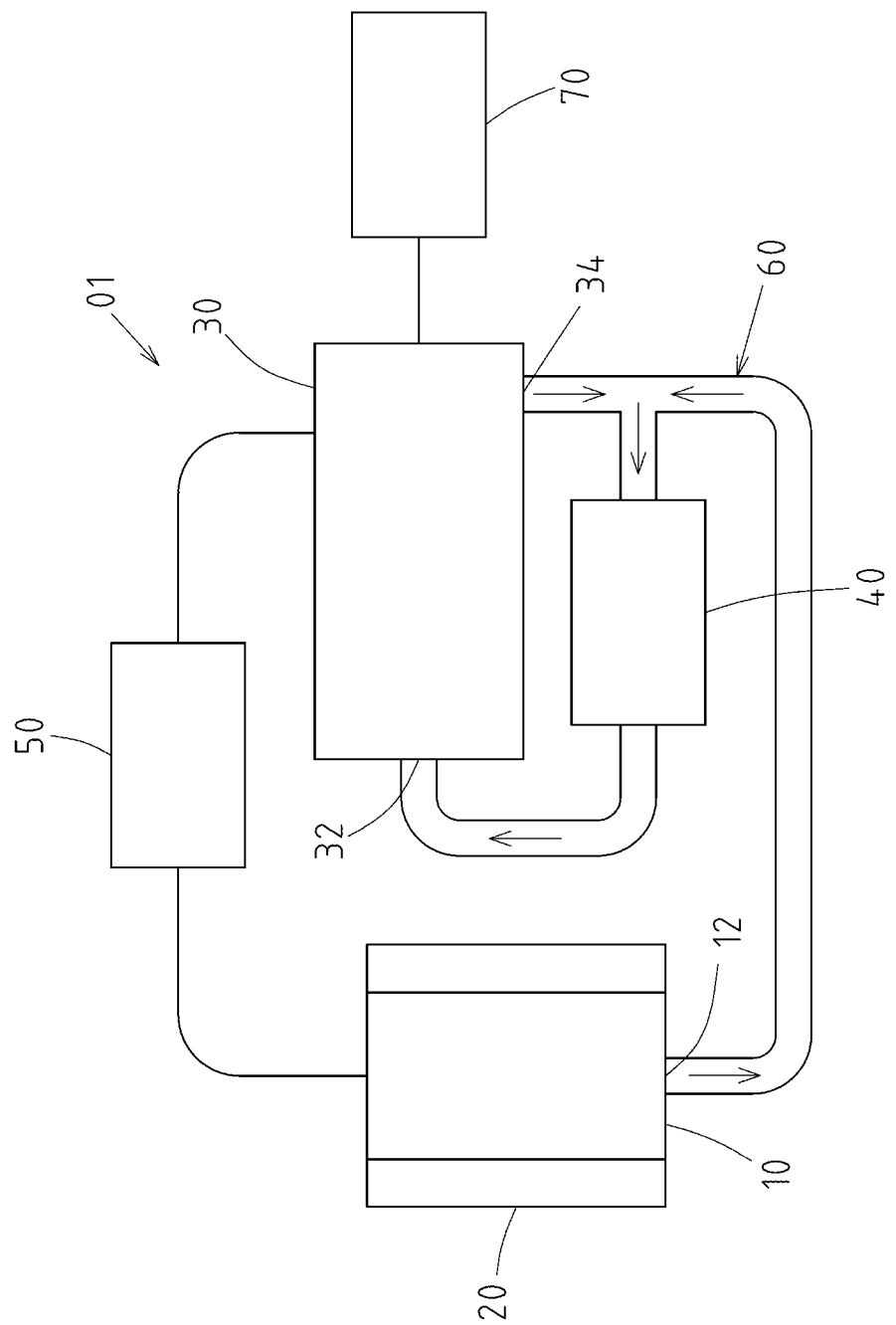
FIG. 1 is a schematic diagram of the fuel cell system for executing the preferred embodiment of the present invention.

As shown in FIG. 1, the preferred embodiment of said dehydrogenation method for hydrogen storage materials is executed by a fuel cell system 01. The fuel cell system 01 includes a hydrogen storage material tank 10, a heating unit 20, a fuel cell 30 with a water thermal management unit, a pump 40, and a heat recovery unit 50. The hydrogen storage material tank 10 is provided with hydrogen storage material (not shown in the figure). The hydrogen storage material tank 10 is disposed on the heating unit 20. The hydrogen storage material tank 10 has a hydrogen outlet 12. The fuel cell 30 has a hydrogen inlet 32 and an unreacted hydrogen outlet 34. The pump 40 connects with the hydrogen outlet 12, the hydrogen inlet 32 and the unreacted hydrogen outlet 34 respectively through a pipeline 60, so that the hydrogen is drawn through the hydrogen outlet 12 and the unreacted hydrogen outlet 34, and the hydrogen is fed to the fuel cell 30 through the hydrogen inlet 32. A diaphragm pump is the preferred choice of the pump 40. The heat recovery unit 50 is coupled with the fuel cell 30 and the hydrogen storage material tank 10, so as to recover the thermal energy generated by the fuel cell 30 and supply the thermal energy to the hydrogen storage material tank 10. The electricity generated by the fuel cell 30 is supplied to an external load 70. The external load 70 can be a secondary battery or an electricity storage device, as well as a motor or an electric device.

The fuel cell 30 can be a Low-Temperature Proton Exchange Membrane Fuel Cell (LT-PEMFC) as required, a High-Temperature Proton Exchange Membrane Fuel Cell (HT-PEMFC), a Phosphoric Acid Fuel Cell or a Solid Oxide Fuel Cell (SOFC). The fuel cell 30 is not limited to the aforesaid types. Any fuel cell with a pump for recovering unreacted hydrogen can be used as the fuel cell 30.

Said dehydrogenation method includes the following steps:

Preparation of the hydrogen storage material tank: the hydrogen storage material is put in the hydrogen storage material tank 10, the hydrogen storage material can absorb and release hydrogen. The hydrogen storage material can be particulate powder in particle size below 10 µm as required. The clearances in the granular hydrogen storage material provide the reactive diffusion paths for hydrogen absorption and hydrogen desorption, and a catalyst can be used as required or partial elements of the hydrogen storage material can be used as catalyst. When the catalyst is used, the catalyst is particulate powder having a particle size below 10 µm. The hydrogen storage material and the catalyst are distributed homogeneously, and the catalyst contacts the hydrogen storage material; and The hydrogen storage material is heated, and a negative pressure state is formed inside the hydrogen storage material tank. The heating unit 20 and the heat recovery unit 50 provide heat energy for the hydrogen storage material tank 10, so that the hydrogen storage material is heated to the dehydrogenation temperature. The pump 40 extracts the hydrogen from the hydrogen storage material tank 10 through the hydrogen outlet 12, so that the hydrogen storage material is in a vacuum environment, the hydrogen storage material is dehydrogenated, and the dehydrogenation efficiency and the amount of hydrogen release are increased. The pump 40 feeds the hydrogen from the hydrogen storage material tank 10 and the fuel cell 30 into the hydrogen inlet 32, so as to increase the efficiency of the fuel cell system 01.

An embodiment of the hydrogen storage material can include, but not limited to Mg-based material, TiFe-based (AB type) material, body-centered cubic (BCC) TiV-based material and Mg2Ni-based (A2B type) material.

An embodiment of the Mg-based material can include, but not limited to Mg, MgH2 and MgNi-based materials. The embodiment comprising MgNi-based material can be Mg2Ni.

The present invention uses Mg, $Ti_1V_{1.1}Mn_{0.9}$, $TiFe_{0.8}Ni_{0.2}$ and $Mg_{2.4}Ni_1Cu_{0.2}$ as hydrogen storage materials, and the dehydrogenation pressure and dehydrogenation temperature derived from test are shown in Table 1 in FIG. 4.

When Mg is used as the hydrogen storage material, the catalyst can be added. The catalyst can be Ti or V, the composition of the hydrogen storage material is 80%~95% atomic percentage, and the composition of the catalyst is 5%~20% atomic percentage. The pump 40 extracts the hydrogen from the hydrogen storage material tank 10, so that the hydrogen storage material is in an absolute pressure range of 0.001 atm~0.396 atm, when the dehydrogenation temperature is ranged from 150° C.~300° C.

When the BCC type TiV-based solid solution material is used as the hydrogen storage material, the embodiment of the hydrogen storage material includes TiVCr and TiVMn. The catalyst is the Ti element and V element in the TiV-based solid solution. The hydrogen storage material is composed of Ti 25%~40% atomic percentage, V 25%~35% atomic percentage, Mn or Cr 30%~50% atomic percentage, so that the hydrogen storage material is in an absolute pressure range of 0.002 atm~0.758 atm, when the dehydrogenation temperature ranges from 30° C.~120° C.

When the TiFe-based material is used as the hydrogen storage material, the chemical formula of TiFe-based material is AB type, wherein A of AB represents the Ti element, and B represents the catalyst element. The catalyst element contains Fe element and trace element. The trace element is substantially selected from the group of Mn element, Zr element, Ni element and their combination. The chemical formula of TiFe-based material can be expressed as Ti1Fe (1-x)Mx, wherein M represents the trace element. The hydrogen storage material is composed of Ti 50%~57% atomic percentage, Fe 38%~44% atomic percentage and the trace element 0.01%~9% atomic percentage, so that the hydrogen storage material is in an absolute pressure range of 0.014 atm~0.832 atm, when the dehydrogenation temperature is ranged from 0° C.~80° C.

When the MgNi-based material is used as the hydrogen storage material, the chemical formula of said MgNi-based material is A2B type, wherein A of A2B represents the Mg element, and B represents the catalyst element. The catalyst element contains Ni element and trace element. The trace element is substantially selected from the group of Cu element, Mn element, Ti element, V element and their combination. The chemical formula of MgNi-based material can be expressed as $Mg_2Ni_{(1-y)}M_y$, wherein M represents the trace element. The hydrogen storage material is composed of Mg 60%~70% atomic percentage, Ni 25%~39.99% atomic percentage and the trace element 0.01%~8% atomic percentage, so that the hydrogen storage material is in an absolute pressure range of 0.001 atm~0.486 atm, when the dehydrogenation temperature is ranged from 100° C.~250° C.

As shown in the following equation 1, the reaction constant k of hydrogen release of Mg-based material can be determined by the product of two reaction constants, which relate to dehydrogenation temperature and dehydrogenation pressure, wherein k(T) represents the reaction constant dominated by dehydrogenation temperature, Q is the activation energy of dehydrogenation of Mg-based material, R is the gas constant, k(P) represents the reaction constant dominated by dehydrogenation pressure, P represents the hydrogen pressure outside solid Mg-based material, $P_{eq}$ is the theoretical equilibrium dehydrogenation pressure. According to Le Chatelier's principle, the Mg hydrogen storage material system with lower activation energy has higher hydrogen desorption rate, and the lower the P value is, the higher is the hydrogen desorption rate.

$$k = k(T) \times k(P) = k_0 \exp\left(\frac{-Q}{RT}\right) \times \left[1 - \left(\frac{P}{P_{eq}}\right)^{0.5}\right] \quad \text{equation 1}$$

Figure 2:
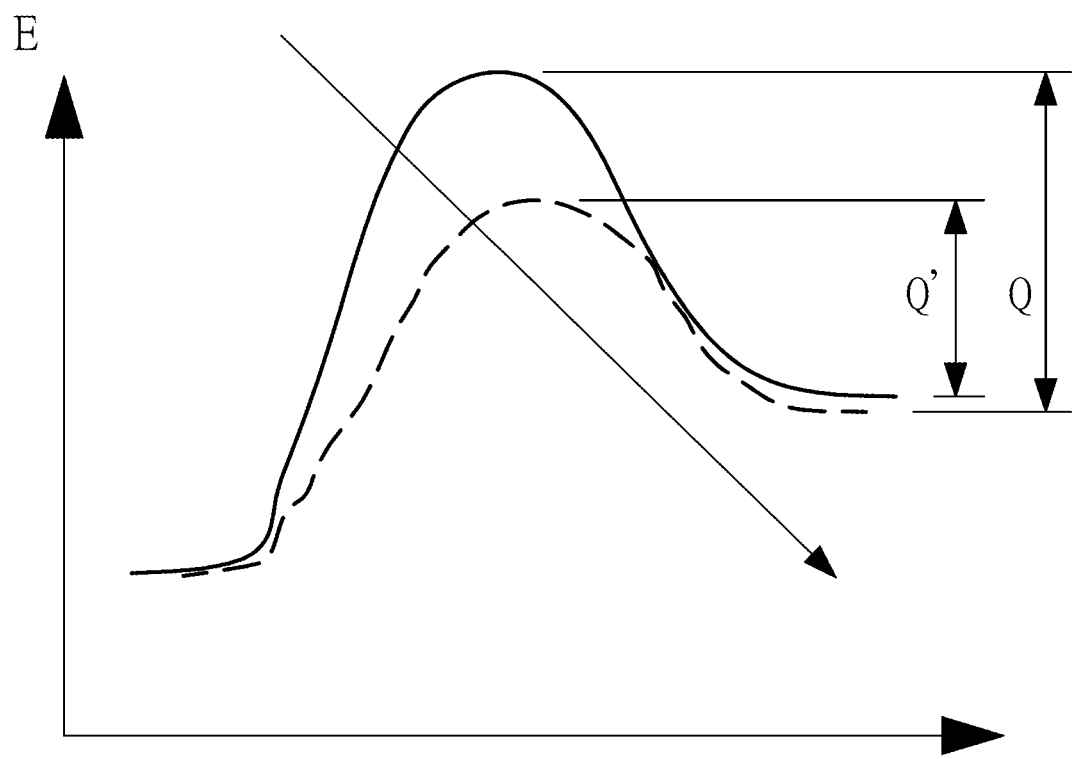
FIG. 2 is a schematic diagram of activation energy curves of the preferred embodiment and the known technology.

FIG. 2 shows an energy profile diagram to indicate a reduction in the activation (Q→Q') for an accelerating dehydrogenation rate of Mg-based materials in the preferred embodiment, in which the vertical axis represents energy and the horizontal axis represents reaction path. The dashed curve is the activation energy curve of the preferred embodiment, and the solid curve is the activation energy curve of the known technology. The activation energy of the known technology is Q, and the activation energy of the preferred embodiment is Q'. When the preferred embodiment is executed, the activation energy is reduced from Q of the known technology to Q', the preferred embodiment has better dehydrogenation rate than the known technology.

Figure 3:
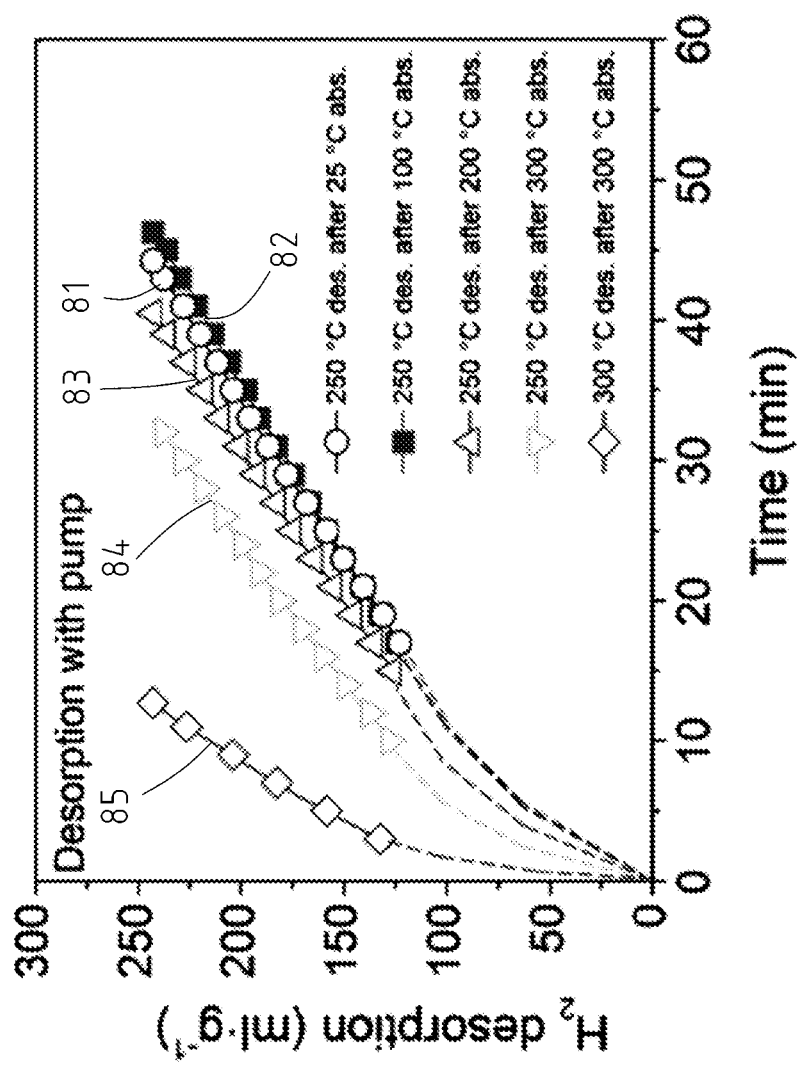
FIG. 3 illustrates dehydrogenation amount curves of executing the preferred embodiment of the present invention.

With the $MgH_2$ is used as the hydrogen storage material, and the $TiH_2$ is used as the catalyst, the dehydrogenation amount curves at dehydrogenation temperatures of 250° C. and 300° C. obtained by executing the preferred embodiment are shown in FIG. 3. The vertical axis represents the hydrogen release amount (unit: $H_2 \cdot ml/g$), and the horizontal axis represents the time (unit: min). Curve I 81 is the dehydrogenation amount curve of the hydrogen storage material at 250° C. when the hydrogen storage material absorbs hydrogen at 25° C. Curve II 82 is the dehydrogenation amount curve of the hydrogen storage material at 250° C. when the hydrogen storage material absorbs hydrogen at 100° C. Curve III 83 is the dehydrogenation amount curve of the hydrogen storage material at 250° C. when the hydrogen storage material absorbs hydrogen at 200° C. Curve IV 84 is the dehydrogenation amount curve of the hydrogen storage material at 250° C. when the hydrogen storage material absorbs hydrogen at 300° C. Curve V 85 is the dehydrogenation amount curve of the hydrogen storage material at 300° C. when the hydrogen storage material absorbs hydrogen at 300° C.

With the $MgH_2$ is used as the hydrogen storage material, and $TiH_2$ is used as the catalyst, the dehydrogenation effects of the preferred embodiment and the known technology are shown in Table 2 in FIG. 5.

In Table 2, the fuel cell 30 is a PEMFC.

As shown in FIG. 3 and Table 2, when the Mg—Ti hydrogen storage material is used, with the assistance of an external pump and at dehydrogenation temperature of 300° C., the dehydrogenation rate of $MgH_2$ increases from 1.1 ml/(min·g) to 19 ml/(min·g). In addition, when the dehydrogenation temperature is 250° C. and an external pump is used as assistance, the dehydrogenation rate of $MgH_2$ is 5.2 ml/(min·g). This dehydrogenation rate has approximated the 6.4 ml/(min·g) of natural dehydrogenation without pump assistance at 350° C.

When the preferred embodiment uses Mg as the hydrogen storage material, the hydrogen storage material is in a hydrogen pressure range of 0.081 atm~0.396 atm, in a dehydrogenation temperature range of 250° C.~300° C. The feasible dehydrogenation rate of Mg materials in the preferred embodiment is close to that of the known Mg hydrogen storage tank at 350° C.

The dehydrogenation method for hydrogen storage materials is executed by the fuel cell system 01. The pump 40 extracts the hydrogen from the hydrogen storage material tank 10, so that the negative pressure state is formed inside the hydrogen storage material tank 10, the dehydrogenation temperature of the hydrogen storage material is reduced, the heat consumption for heating the hydrogen storage material is reduced, and the sintering of the hydrogen storage material induced by high temperature is avoided, the influence on the hydrogen storage capacity of the hydrogen storage material after dehydrogenation is very slight. Therefore, the expected purpose of the present invention can be attained.

With the heat recovery unit 50, the thermal energy generated in the electricity generation of the fuel cell 30 can be recovered for heating the hydrogen storage material tank 10, further reducing the thermal supply for the heating unit 20, and the operating load of the water thermal management unit is reduced.

The invention claimed is:

1. A dehydrogenation method for hydrogen storage materials, the dehydrogenation method being carried out by a fuel cell system having a hydrogen material storage tank and a heating unit and a fuel cell and a pump and a water thermal management unit and a heat recovery unit, the hydrogen material storage tank being disposed on the heating unit, the hydrogen material storage tank having a hydrogen outlet, the fuel cell having a hydrogen inlet and an unreacted hydrogen outlet, the pump being connected with the hydrogen outlet and with the hydrogen inlet and with the unreacted hydrogen outlet, the heat recovery unit being coupled with the fuel cell and with the hydrogen material storage tank so as to recover thermal energy generated by the fuel cell and to supply the thermal energy to the hydrogen material storage tank, the dehydrogenation method comprising:

placing hydrogen storage material in the hydrogen material storage tank such that the hydrogen storage material can absorb and release hydrogen, the hydrogen storage material containing hydrogen;

heating the hydrogen storage material;

forming a negative pressure state in which an $H_2$ absolute pressure below one atmosphere is formed inside the hydrogen material storage tank;

providing thermal energy to the hydrogen material storage tank by the heating unit and the heat recovery unit such that the hydrogen storage material is heated to a dehydrogenation temperature;

extracting the hydrogen from the hydrogen material storage tank with the pump such the hydrogen storage material is in a vacuum environment, the hydrogen storage material being dehydrogenated; and pumping the hydrogen from the hydrogen material storage tank and the fuel cell into the hydrogen inlet with the pump.

2. The dehydrogenation method of claim 1, wherein the hydrogen storage material is magnesium with a catalyst, the catalyst being titanium (Ti) or vanadium (V), wherein the hydrogen storage material has an atomic percentage of 80% to 95% and the catalyst has an atomic percentage of 5% to 20%, the dehydrogenation temperature being 150° C.-300° C.

3. The dehydrogenation method of claim 1, wherein the hydrogen storage material is a TiV-based solid solution, the Ti element and the V element in the TiV-based solid solution is a catalyst, the hydrogen storage material has an atomic percentage of Ti of 25%-40%, of V of 25%-35%, of manganese or chromium of 30%-50%, the dehydrogenation temperature being 30° C. to 120° C.

4. The dehydrogenation method of claim 1, wherein the hydrogen storage material is a TiFe-based material, a chemical formula of the TiFe-based material is AB in which A is a Ti element and B is a catalyst element, the catalyst element contains an Fe element and a trace element, the trace element being selected from the group consisting of manganese (Mn), zirconium (Zr), nickel (Ni) and combinations thereof, the hydrogen storage material having an atomic percentage of Ti of 50% to 57%, of Fe of 38% to 44%, and of the trace element of 0.01% to 9%, the dehydrogenation temperature being 0° C. to 80° C.

5. The dehydrogenation method of claim 4, wherein the trace element is Ni.

6. The dehydrogenation of claim 1, wherein the hydrogen storage material is a MgNi-based material, a chemical formula of the MgNi-based material is $A_2B$ in which A is an Mg element and B is a catalyst element, the catalyst element containing an Ni element and a trace element, the trace element being selected from the group consisting of copper (Cu), manganese (Mn), titanium (Ti), vanadium (V) and combinations thereof, wherein the hydrogen storage material has an atomic percentage of 60% to 70% of magnesium (Mg), 25% to 39.99% of nickel (Ni), and 0.01% to 8% of the trace element, the dehydrogenation temperature being 100° C. to 240° C.

7. The dehydrogenation method of claim 6, wherein the trace element is Cu.

8. The dehydrogenation method of claim 1, wherein the fuel cell is an LT-PEMFC fuel cell.

9. The dehydrogenation method of claim 1, wherein the fuel cell is an HT-PEMFC fuel cell.

10. The dehydrogenation method of claim 1, wherein the fuel cell is a Phosphoric Acid Fuel Cell.

11. The dehydrogenation method of claim 1, wherein the fuel cell is an SOFC fuel cell.

* * * * *